United States Patent Office 3,374,180
Patented Mar. 19, 1968

3,374,180
PROCESS FOR PREPARING SILICA AQUASOLS
Ralph Marotta, St. Louis, Mo., assignor to Monsanto Company, St. Louis, Mo., a corporation of Delaware
No Drawing. Filed Dec. 28, 1964, Ser. No. 421,703
3 Claims. (Cl. 252—313)

ABSTRACT OF THE DISCLOSURE

The present invention is directed to and covers a process for preparing silica aquasols containing 30% or more $SiO_2$ and having colloidal silica particles within the predetermined particle size range hereinafter set forth. This process consists of adding a deionized, acidic silica aquasol to an initial aqueous heel which consists essentially of an aqueous alkali silicate solution having an $SiO_2$/alkali metal oxide ratio of from about 2.5/1 to about 10/1, which heel weight is approximately 5 to 10% of the total acidic silica aquasol weight and said heel is, during said addition, initially at its boiling temperature at the pressure employed and is essentially maintained at such temperature during the addition of said acidic aquasol thereto, thereby causing water to evaporate from the resultant composite of said heel and acidic aquasol, said acidic aquasol being added at such a rate initially that at least from about 25% to about 30% by weight of said acidic aquasol is added at a rate equal to the rate of evaporation of water from said composite as aforesaid. The composite is then continuously heated under conditions of temperature and pressure such that water is continuously evaporated from said composite and until a final silica aquasol product containing about 30% by weight and more of colloidal silica is obtained. The above-described acidic silica aquasol is added in a total amount such as to provide a final silica aquasol having a pH in the range of 8.5 to 10.5. When the initial heel has a ratio of 2.5/1 to 4.5/1, the resultant silica aquasol has a particle size range of about 15 to 30 millimicrons. When the heel has a ratio of 5/1 to 10/1, the resultant product has a particle size of 35 to 60 millimicrons.

---

The present invention relates to improvements in the preparation of highly stable, alkaline silica aquasols, and more specifically relates to the preparation of highly stable, alkaline silica aquasols containing about 30% or more by weight of silica by processes wherein the size of the colloidal silica particles can be controlled within certain desirable limits. This invention more particularly relates to novel processes in the preparation of the aforementioned aquasols and is particularly concerned with processes which comprise, in general, concentrating a deionized, substantially salt-free, acidic silica aquasol having water as substantially the sole liquid phase by addition of such aquasol to a boiling heel, i.e. an alkali metal silicate solution, and subsequently heating the solution formed thereby to yield an end product containing 30% or more by weight of colloidal silica particles which have a definite range of particle sizes suitable for the intended end use. A silica sol containing a definite range of larger size silica particles can also be produced by the aforementioned novel process when a small amount of a prepared large particle size silica aquasol is added to the heel whereby the large particles act as a nuclei for subsequent large particle "build-up."

One of the prior art methods of preparing an aquasol concerns the reaction of a weak solution of sodium silicate with sulfuric acid at a temperature of about 0 to 10° C. to produce a colloidal dispersion or colloidal slurry containing approximately 15 to 20% silica and the remainder being sodium sulfate and water. An organic alcohol, preferably ethyl alcohol, is added to the dispersion in order to dilute the over-all solution, add greater stability thereto, and cause the salt therein to become more insoluble. The resultant solution is then either centrifuged or vacuum filtered to remove the salt therefrom. The clear colloidal solution or dispersion remaining is designated as an alcosol. The alcosol is then passed through a cation and anion exchange column, in any desired sequence, in order to further reduce the salt content of said alcosol and, thereafter, it is made alkaline and concentrated by distilling off alcohol and part of the water. An example of such a process is described in German Patent No. 1,060,852. The alcohol is further recovered by fractional distillation. Since the sales of silica sols are expanding as new commercial uses appear, a new, simpler and more economical process is desired which will not require an expensive initial capital outlay for equipment to perform the aforementioned process functions.

One method for conveniently preparing silica aquasols which eliminates the utilization of sulfuric acid and ethyl alcohol and their associated equipment has been described in the Bird patent, U.S. 2,244,325. According to the Bird method, a water glass (alkaline silicate solution) is passed through a column of (acid activated) cation exchange material in the hydrogen form whereby the alkali metal of the water glass is exchanged for hydrogen and the resultant product is a silica sol of relatively high purity, although it does contain some quantities of chloride and sulfate anions present in the water glass. The silica sol produced is commonly referred to in the art as an aquasol. One general disadvantage in the Bird process of producing the aquasol is that they are produced as relatively dilute solutions, i.e. 1 to 3% silica. Furthermore, the acidic aquasols are less stable at such concentrations than the alcohols and usually have a minimum stability of approximately one or two days at room temperature. To be suitable for most commercial purposes, it is necessary to make these sols alkaline and concentrate them whereby a more concentrated colloidal silica sol is obtained and the stability, i.e. non-gelling property, is greatly increased. In the Bird patent, it is shown that the aquasols produced thereby may be conveniently concentrated by evaporation to silica concentrations as high as 15% silica.

One of the aspects of producing a stable, alkaline, silica aquasol is that the end product sol contains a wide range of colloidal silica particle sizes, i.e. 5–150 millimicrons in diameter. In some instances this is not objectionable in view of the particular end use of the sol. However, in other instances as where the silica sol is employed in wax emulsions and for the anti-soiling of pile fabrics, it is usually necessary to employ silica sols, i.e. aquasols, which are quite clear and have colloidal silica particles of small and relatively uniform size, i.e. 15 to 30 millimicrons in diameter. In other cases, for example, in the treatment of textile fibers prior to spinning where it is necessary to increase their interfiber friction, it is usually desirable to employ silica sols containing colloidal silica particles of larger size, i.e. 35 to 60 millimicrons. These latter type sols are usually cloudy and/or milky and, as stated before, contain colloidal particles of relatively large size. Hence, it is desirable to have a process for preparing stable silica sols of high silica concentrations which contain therein colloidal silica particles of the desired size for the intended end use.

In the Bechtold et al. patent, U.S. 2,574,902, the particle size build-up, i.e. concentration, is accomplished by adding deionized, acidic silica aquasol, containing particles less than 10 millimicrons in diameter, to a heel aquasol also containing silica particles having a diameter less than 10 millimicrons, heating the resultant solution above 60°, and continuing the addition and heating until at least five times as much silica has been added to the heel as was originally present. The aquasols thus formed are characterized by having an $SiO_2$ to $Na_2O$ ratio of from 60:1 to 130:1. The heel is prepared by heating under reflux deionized, silica aquasol having an $SiO_2/Na_2O$ ratio above 80/1 at a temperature above 60° C. for an extended period of time.

In the Rule patent, U.S. 2,577,484, the particle size build-up is effected by utilizing a heel aquasol of silica nuclei upon which the particles could grow. This heel is prepared by taking a portion of the deionized, acidic silica aquasol and adjusting the $SiO_2/Na_2O$ ratio to 150/1 (and greater) with sodium hydroxide and then boiling under reflux. The final aquasol produced was prepared by placing the aforementioned heel in an evaporator and adding additional deionized, acidic silica aquasols to the evaporator at a rate sufficient to maintain a constant volume therein during the total period of evaporation of water therefrom. Additional amounts of sodium hydroxide are also injected into the evaporator in order to maintain the $SiO_2/Na_2O$ ratio of the boiling solution at 150/1 (and greater). The final silica aquasol product is said to have an $SiO_2/Na_2O$ molecular ratio in the range from 130/1 to 500/1 and a particle size range from 10 to 130 millimicrons in diameter.

In the Reuter patent, U.S. 2,929,790, the particle size build-up is also accomplished by feeding deionized, acidic silica aquasol to a heel (acidic, aquasol solution). However, the patentee therein was only concerned with concentrating the aquasol and no particle size limitations were set forth to demonstrate any criticalities pertaining thereto. The initial heel was prepared by adding to a large quantity of a deionized, silica aquasol, sodium silicate solution merely to adjust the pH between 9 and 10.5 and thereafter boiling the aquasol solution. The end product aquasol was thereafter prepared by adding (batchwise) additional amounts of the deionized, acidic aquasol and boiling, whereby a constant volume is usually maintained in the evaporator. Reuter specifically points out that the $SiO_2/Na_2O$ ratio in the aquasol heel is in the range of 50/1 to 130/1.

In accordance with the present invention, it is not only possible to prepare stable, alkaline silica aquasols containing about 30% or more by weight of silica, but it is also possible to prepare by a readily reproducible process such aquasols containing colloidal silica of relatively small or relatively large particle size, i.e. clear or cloudy sols, as desired to meet the intended uses of any compound incorporating these aquasols therein.

It is one object of this invention, therefore, to provide a process for preparing stable, alkaline silica aquasols containing about 30% by weight or more of colloidal silica of relatively small or relatively large particle size within certain limits as desired.

It is a further object of this invention to provide a process for preparing relatively clear, stable, alkaline silica aquasols containing about 30% or more by weight of colloidal silica of relatively small particle size.

It is a further object of this invention to provide a process for preparing relatively cloudy, stable, alkaline silica aquasols containing about 30% by weight or more of colloidal silica of relatively large particle size.

Still further objects and advantages of this invention will be apparent from the subsequent description and the appended claims.

The present invention is predicated upon the discovery that stable, alkaline silica aquasols containing about 30% or more by weight of colloidal silica of a desired or predetermined particle size range of silica particles can be produced from deionized acidic silica aquasols, which are relatively unstable, by a readily reproducible process which, generally, involves passing a weak solution of sodium silicate, containing approximately 1 to 8% silica by weight, through an acid activated cation exchange material whereby the alkali metal ion in such silicate solution is removed therefrom. The acidic effluent sol is then added to a heel which consists essentially of a small quantity (approximately 5 to 10% by weight of the total effluent sol charge weight) of a boiling aqueous sodium silicate solution. The effluent acidic silica sol added to the heel preferably should have a pH of about 2–4, and more desirably a pH of about 2.8 to 3.2, in order to give a combined heel and aquasol which is stable during the subsequent concentration step. It is also critical to maintain the mixture of the effluent sol and the heel above a pH of 7.5, and preferably at a pH in the range of about 8.5 to 10.5, in order to insure that proper particle growth is achieved. The end product residue after concentration then has a pH of about 8.5 to 10.5 which is a factor in obtaining a stable aquasol. (The word stable as used herein refers to the non-gelling property of the sol material.) Prior to and during the addition of the acidic effluent sol to the heel, the heel and the intermediate product formed by the addition of such sol to the heel are maintained at a temperature above 60° C., preferably at about 100° C., and at atmospheric pressure. Such procedure not only results in the evaporation of water from the sol and heel, but also enables the production of a stable alkaline silica aquasol of higher $SiO_2$ concentration and containing silica particles of the desired or predetermined particle size range. While the examples hereinafter set forth were confined to atmospheric pressure, it is within the scope of the present invention to conduct the concentration step either under vacuum distillation or at superatmospheric pressure. Furthermore, the deionization step can be accomplished either by gravity flow or pumping the silicate solution through the cation exchange material.

The novel concept of this invention is specifically centered around the concentration and/or silica particle size build-up of the deionized, acidic silica aquasol which may be prepared by the process as set forth in the Bird patent, U.S. 2,244,325 or by one of the processes set forth in U.S. 2,574,902 in column 7 thereof which are incorporated herein by reference. The production of a stable, alkaline silica aquasol containing 30% or more by weight silica and characterized by having a definite silica particle size range has not been performed by the prior art as hereinbefore set forth.

As can readily be seen from the disclosures of the aforementioned prior art, neither one of the patentees is concerned with the production of an alkaline, stable silica aquasol containing silica particles of a very definite particle size range predicted upon the particular end use of the aquasol. It is also noted that the concentration of the silica aquasols by the aforementioned patentees is carried out in an evaporator while maintaining a constant volume therein during the entire concentration step. The "heels" which are set forth in the aforementioned publications are solutions of the deionized, silica aquasol material and these heels have a pH such as to maintain a high silica $SiO_2/Na_2O$ ratio, i.e. greater than 50/1. While the Reuter patent uses a sodium silicate solution, Reuter uses this merely to adjust the pH of the large quantity of concen- The procedure set forth immediately above is the general one used in this invention. However, in order to produce the large size silica particles, i.e. 35–60 millimicrons in diameter, it is necessary to add a small amount (approximately 5–10% of the heel weight) of previously prepared stable, milky type, large particle size silica aquasol to the sodium silicate solution heel in the concentrator before starting to feed the deionized aquasol thereto. The particle size of the material added to the heel was in the range of from about 50 to about 60 millimicrons; however, any large particle size material, e.g. between 35 and 60 millimicrons, can be utilized contingent upon the desired end particle size. Referring to Table 3 which discloses the date on the aquasol resulting from the concentration step, Run 5 (which was conducted with only a sodium silicate solution as the heel) produced a transparent aquasol containing silica particles of 27.4 millimicrons in diameter. Whereas Runs 6 and 7, which had a similar end yield pH but contained some of the prepared milky or large particle size aquasol in the heel, produced milky or cloudy aquasol products of large particle size, i.e. 54 millimicrons. In Runs 6, 7, 8, and 10, the first 25% of the feed volume was introduced continuously to the concentrator for a period of about one hour, while evaporating water therefrom and maintaining a relatively constant liquid level in the concentrator equal to the initial heel volume of about 400 milliliters. The feed rate was then increased in order that the batch volume in the concentrator would be approximately 850 milliliters by the end of the second hour and a thousand milliliters in 3½ hours. When the feed was completely charged to the concentrator, evaporation was continued to the 500–600 milliliter mark to yield a 30–34% $SiO_2$, milky aquasol which, after cooling, was adjusted to 30% $SiO_2$ with distilled water. The large particle sizes produced from this latter procedure were in the range of from 54 to 60.3 millimicrons. The large particle size, 60.3 millimicrons, was obtained in Run 10 which was made from a turbid feed and a turbid sodium silicate solution heel. It was noted that only a very slight or trace amounts of silica "mud" settled out from the products after standing for seven days at 25° C.

In Runs 1, 2, 3, 4, and 10, dilute sodium silicate solution, without large particle size aquasol material contained therein, was used as the heel; these heels had an $SiO_2$ concentration of 0.7 to 2.0% and a pH of 10.4 to 10.8. In these runs, there were produced transparent aquasols, i.e. aquasols containing small size particles of $SiO_2$, i.e. 15:30 millimicrons in diameter. The feeding rates of these runs, excluding Run 9, were such as to maintain the original heel volume during the first 28% of feed addition while evaporating water at 19 grams per minute. In Run 5, the volume was allowed to build up gradually to 900 cc. by the end of the charge period and then subsequently evaporated to a 30% $SiO_2$ aquasol. The higher pH of the Run 5 "heel" and the maintenance of a smaller boiling volume for the first 28% of the feed resulted in an increased particle size, 27.4 millimicrons versus 19.3 millimicrons, which was obtained in Run 4.

In Run 9, which contained a 2% $SiO_2$ (sodium silicate solution) heel identical to Run 5, the feeding was conducted at a more rapid rate during the first 40 minutes whereby 1350 grams of the feed, 33.7% of the entire batch, were introduced while only 650 grams of water were evaporated therefrom. There remained in the evaporator a volume of 1100 milliliters which was maintained for the remainder of the feed addition while evaporating water at 19 grams per minute. The batch was then evaporated down to a 30% aquasol. However, it was noted that the end product aquasol had significantly high viscosity which generally connotates low stability, and its particle diameter was also lower. This demonstrated the necessity of feeding the first 25 to 30% of the feed charge during the period of at least one hour, as in previous runs, while evaporating about an equal amount of water for proper particle growth during the entire concentration procedure. The results obtained from Run 9 would tend to indicate that there are too many small nuclei present at one time in the concentrator for proper growth therein.

As pointed out in the above discussion, the rate of feeding the silica sol effluent to the concentrator is very critical and also contributes, along with the novel concept of utilizing a sodium silicate heel, to the production of an aquasol containing a definite range particle size of colloidal silica particles. It was determined, then, in Runs 1 through 10 that approximately the first 25% to 30% of the said charge or feed should be fed into the concentrator at about a rate equivalent to the rate of evaporation of the water therefrom. In other words, a constant volume of evaporation should be maintained during the initial feeding of 25 to 30% of the charge. After 25 to 30% of the feed has been charged, the rate of feed is gradually increased and continuously fed thereto.

As set forth in the general procedure, a mechanical stirrer was used in the concentrator. However, this stirring was not found to be a significant factor in modifying the aquasol products of the aforementioned runs. The experience obtained from these tests would dictate, however, that a slow rate of stirring was generally satisfactory.

The acidic aquasols from Runs 1 through 5 were originally derived from a strong soduim silicate solution which was diluted with tap water having appreciable hardness. In addition, the (2% $SiO_2$) sodium silicate solution heel had also been diluted from a (20% $SiO_2$) sodium silicate solution by tap water. The resulting final silica aquasol products had high conductivity, whereas in Runs 6 through 10, distilled water was used as the diluting agent throughout, thereby resulting in a desirably lower conductivity. In Run 1, some of the 30% aquasol product was further concentrated to 37% $SiO_2$; the results were that the high conductivity of the material caused gelling within a period of six weeks whereas the 30% product was also unstable and advanced in viscosity appreciably in eight weeks.

The data concerning the concentration of the unstable aquasols to transparent or milky type stable alkaline aquasols containing 30% $SiO_2$ is set forth in Table 3. The analytical results of the molecular weight and particle size diameter of the products are also shown in Table 3. The equipment utilized in obtaining these results was the Brice-Phoenix Universal Light Scattering Photometer (Phoenix Precision Instrument Corp., Philadelphia, Pa.—Series 1926). The determination of molecular weight by light scattering is a general procedure for silica aquasols. The ascertainment of the silica particle size diameter by light scattering is also a common procedure but the literature usually reports number average particle diameters determined from electron micrographs which are photographs of the particles seen by the electron microscope. The relationship between these two methods indicates that the number average particle diameter for silica is numerically about 75% of the weight average diameter, i.e., 25 millimicrons weight average equals about 18.7 millimicrons number average.

The novel process of this invention as set forth in the above examples and as personified by the data contained in Tables 1, 2, and 3 vividly demonstrates the novel use of a sodium silicate heel containing a low $SiO_2/Na_2O$ ratio, i.e. 2.5/1–10/1 depending upon the desired particle size, in order to produce a stable alkaline silica aquasol containing approximately 30% $SiO_2$ and characterized by a definite range size of silica particles. As set forth in the first part of this specification, the products incorporating aquasols which contain a definite particle size range have numerous applications. One further application is the utilization of the large particle size silica aquasols in order to create a better frictionizing material for textiles, paper, or the like.

trated acidic, silica aquasol heel and not for the purpose of being used as a heel per se. The present invention, which greatly differs from the aforementioned prior art, is concerned with the utilization of only a boiling sodium silicate solution (containing a 2.5–4/1 $SiO_2/Na_2O$ ratio but preferably having a 3.25/1–3.75/1 $SiO_2/Na_2O$ ratio) as the heel and the subsequent scheduled feeding of deionized, acidic silica aquasol material thereto, whereby water is evaporated from the combined solutions to yield a highly stable, alkaline silica aquasol containing a definite range of silica particle size, i.e. 15–30 millimicrons in diameter. Furthermore, it has been discovered that the addition of small quantities (approximately 5–10% of the heel weight) of a prepared alkaline silica aquasol, containing silica particles in the range of 35–60 millimicrons, to the sodium silicate heel to yield an overall 5/1–10/1 $SiO_2/Na_2O$ ratio, but preferably having a 6.5–7.5/1 $SiO_2/Na_2O$ ratio, will produce a final aquasol having the average silica particles within the 35–60 millimicron diameter range. The addition of small quantities of the prepared aquasol, containing large size silica particles, to the heel effects a nuclei upon which additional large size particles may grow. It is visualized that with each increment of low molecular weight, silica aquasol fed to the boiling batch, some of the new silica adds on or "builds on" to the older established nuclei and some form new small silica nuclei, the proportion of each type of reaction dependent on the equilibrium or condition prevalent during the time increment. The particle size build-up is repeated many times over during the entire feeding period. Although it is believed that this is what happens, it is desired not to be bound by any theory as to what actually happens in the processes of this invention.

The best method contemplated for the practice of this invention is illustrated by the following example.

*Example*

The deionized, acidic, silica aquasol employed was prepared in a manner similar to that described in the aforementioned Bird patent, U.S. 2,244,325. A sodium silicate solution of 3.25/1 $SiO_2/Na_2O$ ratio containing 20.2% silica was first diluted with tap water to make feeds for the Runs 1 through 5 which are disclosed in Table 1. Distilled water was used to dilute the strong sodium silicate solution in Runs 6 through 10, also shown in Table 1. Run 10 employed a turbid sodium silicate solution of 3.75/1 $SiO_2/Na_2O$ ratio and containing therein 25.3% silica. This gave a turbid effluent which was one-third as turbid as the starting feed. The sodium silicate solutions, designated as Runs 1–10, were then passed through a cation resin column. The column consisted of a 4-foot Pyrex pipe, 2-inch I.D., containing a 23-inch bed of water—wet Rohm and Haas resin "Amberlite IR–120" which is in the hydrogen form. The quantity of the sodium silicate solution feed pumped into the column was predetermined in each run, and was maintained at about 5 to 10% in excess over the resin exchange capacity. When the sodium silicate feed was all transferred to the column, pumping was continued using tap water to displace the sodium silicate solution in the column. The first 700 ml. of effluent collected which was at about pH 2.6 consisted of water from the wet resin, the pump priming and the transfer lines; this effluent material was discarded. The dilute, silica aquasol effluent was then collected mostly at a pH of 2.5–3.0 up to a cutoff point of 3.5–4.0. At this particular point the bottom one-third column of the resin contained the excess sodium silicate employed in the run, and it was collected separately for possible use, i.e. recycle, in making up the next sodium silicate feed solution for the column. Table 1 presents the data of the deionizing step wherein there were a total of ten runs through the cation exchange column. The amount of effluent obtained from each run is also set forth in Table 1 which discloses the pH and the weight percent silica contained in said effluent. In Run 4, a sodium silicate solution containing 8% $SiO_2$ was fed to the column; this corresponded to 90% of the resin exchange capacity. During the last part of Run 4, a sodium silicate solution containing 3.5% silica was fed to said column to complete the final 10% of the feeding. Feeds of Runs 5, 6, and 7 were introduced in a similar manner. In Runs 4 and 5, the sodium silicate feeds were introduced at 20° C. but at 25° C. in the other runs. In deionizing the sodium silicate solution containing 8% $SiO_2$, a temperature rise of 10° C. was noted, whereas a 5% $SiO_2$ silicate solution effected a 3° C. rise. Sodium silicate solutions containing more than 8% $SiO_2$ were not deionized because of their resulting low stability, i.e. high gelling property; this facet of the invention is readily seen in Table 2. The deionizing of the sodium silicate solutions and the data concerning the effluent are disclosed in Table 1. The stability data for the acidic aquasols produced from the deionized sodium silicate solutions is presented in Table 2. It was further noted that the effluent aquasols containing 4% $SiO_2$ at 25° C. gel in minutes if made to a pH of 5–6.5, but may be stable for several days at a pH of 8–11. However, when deionizing, it is desirable not to leak through large amounts of sodium such as would give a pH in excess of 4.

It was also noted, in conjunction with the deionization step, that the high sodium ion concentration in the sodium silicate solutions allows relatively short "on stream" times whereby a large portion of the total column time cycle is spent in washing, regenerating, and rinsing the resin. Therefore, the shortest tolerable regeneration cycle should be used.

The acidic aquasols (pH 2–4) of Runs 1 through 10 were allowed to stand 4 to 24 hours at 25° C. and then were fed into a concentrator. This retention had no adverse effect on the novel process of this invention. The concentrator consisted of a 2-liter beaker which contained a mechanical stirrer, a Teflon film cover, a three-fourths inch diameter opening for expelling steam, and a small opening to fit a capillary glass tube through which the feed was introduced above the batch liquid level boiling at atmospheric pressure and at about 100° C. The beaker was also insulated with several layers of aluminum foil and was heated with a 1200-watt hot plate which was capable of evaporating about 19 grams of water per minute. In view of the working liquid levels and the "above or free board" space in the concentrator, some forming occurred therein but of little consequence to adversely effect the desired end result.

The procedure consisted in initially adding a calculated amount of a dilute sodium silicate solution to the concentrator as a heel, heating the solution therein to boiling, and immediately thereafter starting to feed the acidic aquasol charge continuously thereto while evaporating water from the solutions in the concentrator. The amount of dilute sodium silicate solution to be used as the heel material was previously ascertained by diluting a 100-gram aliquot of the acidic aquasol with about 100 milliliters of distilled water and titrating with a 2% $SiO_2$ sodium silicate solution containing a 3.25/1 $SiO_2/Na_2O$ ratio estimated to the pH end points shown in Table 3 which would then result in a product residue having a pH range of from about 8.5 to 10.5. The weight in grams of the actual 2% $SiO_2$ sodium silicate solution used, which averaged about 5 to 10% by weight of the total effluent weight, as the heel is given by the following arbitrary formula:

$$\frac{(Gms\ acidic\ sol\ charge)}{100} = (ml\ at\ pH\ end\ points\ in\ Table\ 3)$$

When the total amount of the feed material was charged by means of scheduled feeding to the concentrator, the evaporation heating was continued until the product residue (aquasol) contained approximately 30% $SiO_2$. The steam from the concentrator was allowed to escape without condensation during the evaporation step.

TABLE 1.—DEIONIZING SODIUM SILICATE THROUGH A CATION RESIN COLUMN

[4 ft. Pyrex pipe, 2″ i.d., 23″ resin bed IR-120]

| Run No. | Sodium Silicate Feed, Percent $SiO_2$ | Feed Rate, ml./min. | Maximum Effluent Temperature Attained, °C. | Effluent Collection Cutoff, pH | Composite Effluent, pH | Composite Effluent, gms. | Composite Effluent Conc., Percent $SiO_2$ | Composite Effluent Total $SiO_2$, gms. |
|---|---|---|---|---|---|---|---|---|
| 1 | 2.0 | 240 | 26 | 4.5 | 2.5 | 10,800 | 1.8 | 194 |
| 2 | 3.5 | 103 | 26 | 4.0 | 2.47 | 6,660 | 2.95 | 196 |
| 3 | 6.0 | 94.5 | 29 | 4.0 | 2.57 | 3,777 | 5.20 | 196 |
| 4 | 7.1 ave. (90% of 8% $SiO_2$,* 10% of 3.5% $SiO_2$) | 135 | 30 | 4.0 | 2.9 | 3,400 | 5.72 | 194.5 |
| 5 | 7.52 ave. (95% of 8% $SiO_2$,* 5% of 3.5% $SiO_2$) | 147 | 30 | 4.3 | 2.75 | 2,868 | 6.48 | 186 |
| 6 | 5.25 ave. (80% of 6% $SiO_2$,* 20% of 3.4% $SiO_2$) | 144 | 28 | 4.0 | 3.20 | 3,971 | 4.7 | 186 |
| 7 | 5.25 ave. (80% of 6% $SiO_2$,* 80% of 3.5% $SiO_2$) | 125 | 28 | 3.1 | 3.30 | 4,035 | 4.85 | 186.5 |
| 8 | 4.75 | 125 | 26.5 | 4.1 | 3.20 | 4,259 | 4.18 | 178 |
| 9 | 5.0 | 125 | 27.5 | 3.6 | 2.9 | 4,306 | 4.32 | 186 |
| 10 | 5.0 | 125 | 28.2 | 3.50 | 3.18 | 4,849 | 4.53 | 219.4 |

*Sodium silicate solutions.

TABLE 2.—STABILITY OF ACIDIC SILICA AQUASOL

[Effluent from ion exchanging sodium silicate with IR-120 cation resin]

| Run No. | $SiO_2$ Conc., percent | pH | Samples Aged at 25° C.—Elapsed Time Since Preparation (hours)—Viscosity, 25° C., by Special 25 ml. Pipette, seconds | | | | | | | |
|---|---|---|---|---|---|---|---|---|---|---|
| | | | Hrs. | Visc. | Hrs. | Visc. | Hrs. | Visc. | Hrs. | Visc. |
| 2 | 2.95 | 2.47 | 72 | 20 | 144 | 22.5 | 216 | 30 | 240 | Gel. |
| 3 | 5.20 | 2.57 | 0.2 | 20 | 24 | 22 | 45 | 29 | 72 | Gel. |
| 4 | 5.72 | 2.9 | 1 | 21.5 | 18.5 | 24 | 26 | 26.5 | 41 | Gel. |
| 5 | 6.48 | 2.75 | 1 | 20.5 | 21.6 | 26.5 | 25.5 | 30 | <40 | Gel. |
| 6 | 4.7 | 3.2 | 3 | 20.5 | 28 | 23 | 50 | 28.5 | 69 | Gel. |
| 7 | 4.58 | 3.1 | 4.5 | 21 | 30 | 23.5 | 60 | 28.5 | <96 | Gel. |
| 8 | 4.18 | 3.30 | 24.5 | 22 | 53 | 24.5 | 73 | 31 | <96 | Gel. |
| 9 | 4.32 | 2.9 | 22 | 21.5 | 40 | 24 | 65 | 29 | <96 | Gel. |
| 10 | 4.53 | 3.18 | 1 | 20 | 23 | 22.5 | 45 | 29 | 72 | Gel. |

Reference Material:

| | Viscosity, Seconds |
|---|---|
| Water | 20 |
| Clear aquasol | 25 |
| Milky aquasol | 25 |

TABLE 3.—CONCENTRATING UNSTABLE AQUASOLS (FROM TABLE 1) TO TRANSPARENT, OR MILKY TYPE, STABLE 30% $SiO_2$ SOLS

| Run No. | Unstable Effluent Feed to concentrator, gms. | $SiO_2$ Conc. in Feed, Percent | Feed Titration Using 2% $SiO_2$ Sodium Silicate (3.25/1 ratio), ml./100g. feed | Estimating Values for End, pt. pH | 3.25/1 Type Sodium Silicate in Heel, etc. | Ratio, $SiO_2$/$Na_2O$ in Heel | Heel, pH |
|---|---|---|---|---|---|---|---|
| 1 | 9,470 | 1.8 | 3.7 | 6.91 | 350 g., 2% $SiO_2$ Silicate+390 g. dist. $H_2O$ | 3.25/1 | 10.5 |
| 2 | 6,210 | 2.95 | 5.8 | 7.17 | 360 g., 2% $SiO_2$ Silicate+641 g. dist. $H_2O$ | 3.25/1 | 10.4 |
| 3 | 3,433 | 5.20 | 8.02 | 6.9 | 276 g., 2% $SiO_2$ Silicate+514 g. dist. $H_2O$ | 3.25/1 | 10.4 |
| 4 | 3,810 | 5.72 | 8.66 | 7.27 | 276 g., 2% $SiO_2$ Silicate+485 g. dist $H_2O$ | 3.25/1 | 10.4 |
| 5 | 2,653 | 6.48 | 11.62 | 7.38 | 308.5 g., 2% $SiO_2$ Silicate | 3.25/1 | 10.8 |
| 6 | 3,753 | 4.7 | 9.53 | 7.5 | 357 g., 2% $SiO_2$ Silicate+23.8 g., 30% $SiO_2$ [1] | 6.5/1 | 10.8 |
| 7 | 3,877 | 4.58 | 9.41 | 7.66 | 365 g., 2% $SiO_2$ Silicate+32 g., 30% $SiO_2$ [1] | 7.5/1 | 10.8 |
| 8 | 4,056 | 4.18 | 9.87 | 7.70 | 320 g., 2.5 g. $SiO_2$ Silicate+27 g., 30% $SiO_2$ [1] | 6.55/1 | 11.0 |
| 9 | 4,104 | 4.32 | 9.32 | 7.38 | 382 g., 2% $SiO_2$ Silicate | 3.25/1 | 10.8 |
| 10 | 4,655 | 4.53 | [2] | 7.69 | 27 g., 30% $SiO_2$ [1] Run 8 Prod.+386 g., 2.89% $SiO_2$ Silicate of 3.75/1 ratio. | 6.48/1 | 11.0 |

| Run No. | End Product Appearance | Viscosity Special, 25 ml. Pipette, 25° C. seconds | End Product, pH | Conductivity at 25° C. (30% $SiO_2$), μmhos | End Product Ratio, $SiO_2$/$Na_2O$ | Molecular Weight, millions | Weight Ave. Particle Diameter (millimicrons), m |
|---|---|---|---|---|---|---|---|
| 1 | Transparent | 25 | 8.70 | 6,900 | 171 | 4–5 | 18–19 |
| 2 | do | 24 | 9.48 | 5,230 | 157 | 4–5 | 18–19 |
| 3 | do | 25 | 8.7 | 4,600 | 170 | 4–5 | 18–19 |
| 4 | do | 24 | 8.95 | 4,000 | 167 | 4.95 | 19.3 |
| 5 | do | 25 | 9.1 | 4,000 | 161 | 14.25 | 27.4 |
| 6 | Milky | 24 | 9.9 | 2,350 | 168 | 109 | 52 |
| 7 | do | 25 | 9.9 | 2,440 | 166 | 107.4 | 54 |
| 8 | do | 24 | 10.1 | 2,360 | 152 | 117 | 55.4 |
| 9 | Transparent | 30 | 9.40 | 3,305 | 110 | 4.06 | 18.1 |
| 10 | Milky | 25 | 10.05 | 2,440 | 146 | 150.2 | 60.3 |

[1] Large particle size (50–60 millimicron) stable aquasol. [2] 8.3 ml. of this.

What is claimed is:

1. A process for producing stable, alkaline, silica aquasols of about 30% by weight or higher silica concentration consisting essentially of water and colloidal silica particles, substantially all of which particles are within a 35 to 60 millimicron particle diameter range, and which consists essentially in the steps of (1) passing an aqueous alkali metal silicate solution through an acid form, cation exchange material whereby the alkaline metal ion in said solution is removed therefrom to yield an effluent which is an aqueous, acidic silica aquasol containing 1–8% by weight silica and having a pH between 2 and 4; (2) concentrating said effluent by adding it to an initial aqueous heel which consists essentially of an aqueous, alkaline metal silicate solution having an $SiO_2$/alkali metal oxide weight ratio of from about 5/1 to about 10/1 and containing about 2% $SiO_2$ by weight and also containing in addition thereto from about 5% to about 10% by weight, based on the weight of said heel, of a 35 to 60 millimicron particle size aquasol which acts as nuclei for subsequent particle size build-up, said heel, during said addition, being initially at its boiling temperature at the pressure employed and being essentially maintained at such temperature during the addition of said effluent thereto, thereby causing water to evaporate from the resultant composite of said heel and said effluent, said effluent being added at such a rate initially that at least from about 25% to about 30% by weight of said effluent is added at a rate equal to the rate of evaporation of water from said composite; and (3) continuing the heating of said composite under conditions of temperature and pressure such that water is continuously evaporated from said composite and until the final silica aquasol product containing about 30% or more by weight of colloidal silica is obtained, said effluent being added in a total amount such as to provide a final silica aquasol having a pH in the range of about 8.5 to about 10.5, said colloidal silica particles in said final silica aquasol having the aforesaid predetermined particle size range of 35 to 60 millimicrons in diameter.

2. A process for producing stable, alkaline, silica aquasols consisting essentially of water and approximately 30% or more by weight colloidal silica particles, substantially all of which particles have a particle size range of 35 to 60 millimicrons, which consists essentially in the steps of (1) passing an alkaline sodium silicate solution containing 2–8% silica by weight and having an $SiO_2/Na_2O$ ratio of about 2.5/1–4/1 through an acid activated cation exchanger to yield an acidic silica aquasol effluent of limited stability and being substantially free of alkali metal ions, containing a 2–7% $SiO_2$ by weight and having a pH between 2.5 and 3; (2) feeding the first 25% to 30% by volume of the total effluent to a heel, which is approximately 5–10% by weight of the total weight of the effluent, consisting essentially of a boiling alkaline sodium silicate solution having an $SiO_2/Na_2O$ ratio of about 5/1–10/1 and containing a previously prepared 35 to 60 millimicron particle size aquasol, which is approximately 5–10% by weight thereof, and which acts as nuclei for particle size build-up, at a rate equivalent to the rate of water evaporation from the combined effluent and heel solutions, said heel having a pH range of 10.5 to 11 and (3) continuing the heating of the combined effluent and heel solutions above 60° and at atmospheric pressure until sufficient water has evaporated to yield an end product residue containing 30% or more by weight colloidal $SiO_2$ particles, which have a particle size range of 35 to 60 millimicrons in diameter, and said residue having a pH range of 9.5 to 10.5.

3. The process as set forth in claim 2 wherein the sodium silicate solution which is to be deionized has an $SiO_2/Na_2O$ ratio of 3.25/1–3.75/1 and the heel $SiO_2/Na_2O$ ratio is 6.5/1–7.5/1.

References Cited

UNITED STATES PATENTS 2,577,484   12/1951   Rule _____ 252—313
2,929,790   3/1960   Reuter et al. _____ 252—313

LEON D. ROSDOL, *Primary Examiner.*

R. D. LOVERING, *Assistant Examiner.*